Jan. 7, 1969    G. A. RINARD ET AL    3,421,053
TUMBLER SYSTEM TO PROVIDE RANDOM MOTION
Filed Sept. 14, 1965
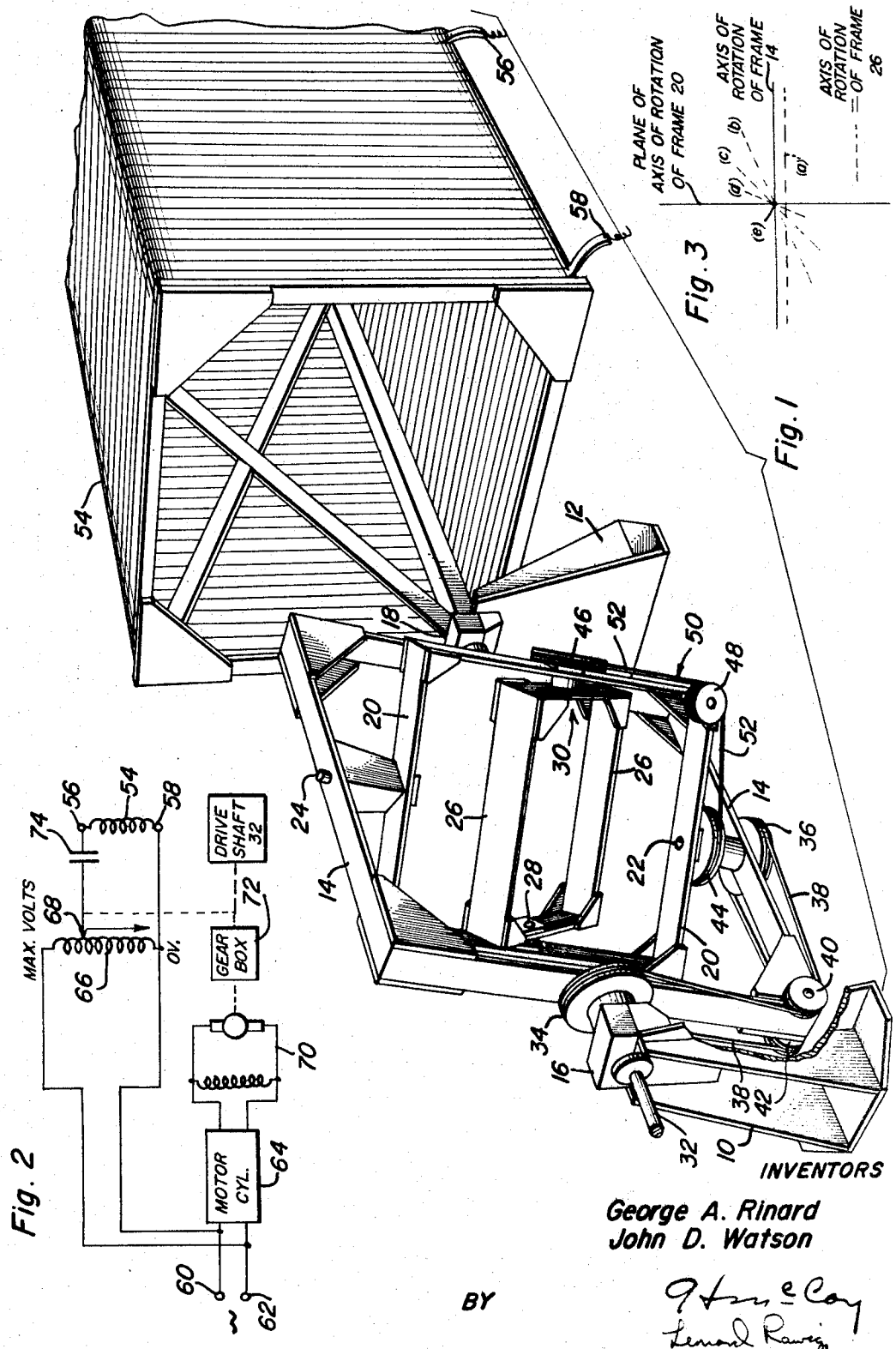
INVENTORS
George A. Rinard
John D. Watson

United States Patent Office 3,421,053
Patented Jan. 7, 1969

3,421,053
TUMBLER SYSTEM TO PROVIDE RANDOM MOTION
George A. Rinard, Columbia, Mo., and John D. Watson, Bellevue, Wash., assignors to the United States of America as represented by the Administrator of the National Aeronautics and Space Administration
Filed Sept. 14, 1965, Ser. No. 487,344
U.S. Cl. 317—157.5          10 Claims
Int. Cl. H01f 13/00

ABSTRACT OF THE DISCLOSURE

A tumbling apparatus having three rotating mutually perpendicular frames, each frame being driven from the drive shaft of the outermost frame. Objects to be demagnetized are positioned on the innermost frame within a slowly varying AC magnetic field, said field amplitude being controllable so that reduction of the amplitude of the field while said objects to be demagnetized tumble therethrough resulting in removal of remanent magnetization.

---

The invention described herein may be manufactured and used by or for the Government of the United States of America for governmental purposes without the payment of any royalties thereon or therefor.

This invention relates to a tumbling apparatus and more specifically to an apparatus and method for imparting random motion to objects positioned within the apparatus. Although the invention is useful for mixing chemicals, drugs and foods, or for tumbling, polishing or pulverizing various materials, the invention has particular applicability in the field of demagnetization and will be described and illustrated with reference to operations of this type.

In the field of space exploration, care must be observed in regard to the possibility of detrimental magnetic fields associated and caused by the materials of which the exploring vehicle is constructed. The magnetic field which arises from the magnetic materials used in the construction of satellite components, can be detrimental to satellite performance. This is particularly true if the satellite's mission relates to the measurement of the earth's magnetic field at several points from the earth's surface. It may well be that the magnetic field of the satellite, because of remanent magnetization of ferromagnetic materials used in its construction, is of a magnitude similar to the field to be measured.

Accordingly, it becomes desirable that the magnetic field associated with satellite components be eliminated or at least substantially reduced to where their effects are negligible. It has been found that most of the remanent magnetization in a satellite component may be removed by a demagnetization process prior to assembly of the satellite. Demagnetization includes the cycling of the hysteresis loops and, consequently, the remanent magnetization from some maximum value to zero. The maximum value will depend upon the amplitude of the initial demagnetization field strength. The maximum amplitude of the initial field strength must be of the order of the cohesivity of the material to insure removal of saturated remanences.

Prior to the present invention, demagnetization of objects was accomplished by a DC magnetic test facility making use of Helmholtz coils energized by alternate polarity pulses to produce the diminishing magnetic field essential to the cycling process. This system operated to measure the field of the component to be demagnetized, determined the direction of the magnetic field intensity, aligned this axis with the axis of the Helmholtz coils, then demagnetized the component along this axis.

Although satisfactory results were obtained by the DC method, the results were not completely acceptable so that effort was directed to determine if an AC demagnetization process would be more effective than the DC method for achieving the objective of reducing permanent magnetization of an object to a minimum value. The effort was fruitful and will be discussed and illustrated in detail with reference to the foregoing specification.

In AC demagnetization, it is a normal procedure to randomly rotate or tumble a component having an undesirable remanent magnetization in an alternating magnetic field which may be reduced gradually to zero from an initial maximum value. It is imperative that the rate at which the AC field is decreased be uniform and slow, compared with the rotational speed of the component being demagnetized. The motion of the component to be demagnetized in the field should be as random as possible so as to insure that all directions in the component are subjected to the demagnetization action of the alternating magnetic field.

Accordingly, a tumbling system was designed in order to provide the random motion required for successful demagnetization. The apparatus includes a rotatable outer frame, a rotatable intermediate frame, and a rotatable inner frame. The frames are so intercoupled and cooperate with each other so that controlled random motion is applied to components or materials secured within the inner frame by the application of rotary motion to the outer frame only. The intermediate and inner frames are driven by the rotary motion supplied to the outer frame. According to this construction, there are always two mutually perpendicular axes of rotation. These are provided by the outer and intermediate frame axes. The third axis (the axis of the inner frame) cycles or is continually traveling from a position parallel to that of the first axis to a position mutually perpendicular to both the other axes. The axes have speeds of rotation in the order of 18:19:20, the inner frame turning at the fastest speed and the outer frame at the slowest speed. With this ratio, any direction in the component performs a Lissajou figure during rotation, and all directions of the component secured within the inner frame are subjected to the demagnetization action of the field.

Thus, when objects are so positioned and rotated within the apparatus and subjected to a demagnetization field, the specifics to be hereinafter set forth, demagnetization of the objects or materials is achieved to a degree unknown to the prior art.

Accordingly, it is the principal object of the present invention to improve random motive devices and methods.

It is a further object of the present invention to improve devices and methods for facilitating demagnetization of objects.

It is a further object of the present invention to improve devices and methods for facilitating demagnetization of objects by subjecting the objects or material to be demagnetized to the field induced by an alternating current.

It is a further object of the present invention to provide a tumbling apparatus for producing random motion to objects retained in the apparatus.

It is a further object of the present invention to provide a means for demagnetizing objects by inserting the objects in an A.C. electrical field and imparting random motion thereto.

It is a further object of the present invention to provide an apparatus wherein a single drive means will cause the rotation of objects placed therein about three axes.

It is a further object of the present invention to provide an apparatus wherein a single drive means produces rotation about a first axis, a second axis perpendicular thereto, and a third axis which oscillates from a position parallel to one of the first two axes to a position perpendicular to both the first and the second axes and return.

It is a still further object of the present invention to provide a means and method for demagnetizing objects under controlled conditions of position, rate of change of position, and rate of change of the A.C. magnetizing field.

The invention both as to its organization and method of operation together with further objects and advantages thereof will best be understood by reference to the following specification taken in conjunction with the accompanying drawings in which:

FIGURE 1 is a perspective view of the invention and illustrating the object tumbling device and the coil for producing the demagnetizing field;

FIGURE 2 is an electrical schematic, partly in block diagram, and showing the control of the rotational motion imparted to the tumbling apparatus and the uniform reduction of the magnetic field; and FIGURE 3 is a graph partially depicting the relative positions to an observer of the three frames of the tumbling apparatus.

As shown in the FIGURE 1, the tumbling apparatus includes a pair of pedestals or supports 10 and 12 adapted to receive an outer frame 14 at the bearing supports 16 and 18 so as to provide a horizontal axis of rotation for the outer frame 14. All of the foregoing elements, as are the remaining elements of the tumbler system to be described, are of non-metallic construction such as wood, resins, etc.

The outer frame 14 is generally rectangular (or square as shown) and suitably supported and reinforced at its sides in any convenient manner.

An intermediate frame 20 is journaled for rotational motion within the outer frame 14 by any suitable bearings such as those, not shown, associated with the shafts 22 and 24. With such an arrangement, it will be observed that the axis of rotation of the intermediate frame 20 along the shafts 22 and 24 is at all times perpendicular to the axis of rotation of the outer frame 14 about the bearing supports 16 and 18. In a manner similar to the outer frame 14, the intermediate frame 20 is suitably reinforced, as shown, and of non-metallic construction.

A third frame, an inner frame 26 is journaled for rotation within and supported by the intermediate frame 20 by suitable bearings indicated at 28 and 30. The inner frame 26 may be reinforced at its corners, as shown, and it is within the inner frame 26 that the objects or material to be rotated are secured. The manner of securing the material or objects will depend upon the nature of the objects and the appropriate securing means will be readily envisioned by those skilled in the art. For example, if a casting is to be rotated, then means would be employed to secured the casting to the inner frame 26. If particulate or comminuted material is to be rotated, then a suitable container enclosing the material would be secured within the inner frame 26.

Thus far, the mounting of the outer frame 14, the intermediate frame 20 and the inner frame 26 have been described and the means for rotating the foregoing frames will now be detailed. Rotary motion applied to a shaft 32 will rotate the outer frame 14 about a horizontal axis, as shown. A pulley 34 is secured to the support 10 adjacent the bearing support 16. The pulley 34, being fixed to the support 10, remains stationary. A second pulley 36 is coupled to the shaft 22 which when rotated provides rotary motion to the intermediate frame. A pair of direction pulleys 40 and 42 are secured to one corner of the outer frame 14, the pulleys 40 and 42 being positioned upon a common shaft and freely rotatable thereon. A belt 38 passes over the pulleys 34, 40, 36 and 42. As the frame 14 is rotated by the shaft 32, the belt 38 is "walked" about the pulley 34 thus rotating the pulley 36 and resulting in a rotation of the intermediate frame 20 about an axis through the shafts 22 and 24. The rotation thus produced by the pulleys 34, 36, 40 and 42 and the belt 38 results in the intermediate frame 20 being rotated about an axis which is at all times perpendicular to the axis of rotation of the outer frame 14.

A similar arrangement is illustrated for causing rotation of the inner frame 26. A pulley 44 is secured to the intermediate frame 20 by any suitable means. A second pulley 46 is journaled on a side 90 degrees removed from the fixed pulley 44 and adapted to rotate the inner frame 26 about an axis concentric with the bearings 28 and 30 upon which the inner frame 26 is mounted. A pair of intermediate direction pulleys 48 and 50 (the direction pulley 50 being hidden behind the reinforcing structure of the intermediate frame 20) are on a common shaft, the pulleys 48 and 50 being freely rotatable upon their common shaft. A belt 52 passes about the pulley 44 fixed to the intermediate frame 20, the pulley 48, the pulley 46 and the pulley 50 so that as the intermediate frame 20 is rotated, the pulley 44 fixed thereto causes the belt 52 to be "walked" about its periphery so that the direction pulleys 48 and 50 rotate in opposite directions and drive the pulley 46. The rotation of the pulley 46 causes rotation of the inner frame 26 and any objects or material secured therein.

It will be noted that the axis of rotation of the inner frame 26 oscillates between a position parallel to the axis of rotation of the outer frame 14 to a position of mutual perpendicularity with both the axes of rotation of the outer frame 14 and the intermediate frame 20.

The rotation of the three frames 14, 20 and 26 may be better understood with reference to the FIGURE 3. The axis of rotation of the outer frame 14 is shown as the abscissa whereas the axis of rotation of the frame 20 is depicted as the ordinate. It will be readily understood that although the two axes are always mutually perpendicular, the axes of rotation of the intermediate frame 20 is changing from a position parallel to the plane of the paper (as shown) to a position perpendicular or into the plane of the paper.

We will assume that the axis of rotation of the frame 26, set forth in successive positions in dotted outline in the FIGURE 3, commences from a position indicated at $a$ which is parallel to the axis of rotation of the outer frame 14. It will be understood at this point, that the axis of rotation of the intermediate frame 20 would be perpendicular to the plane of the paper and not perpendicular to the axis of rotation of the outer frame 14. For simplification, reference to the successive positions of the axis of rotation of the intermediate frame 20 will be omitted during the discussion of the rotation of the inner frame 26.

With continued reference to the FIGURE 3, the axis of rotation of the inner frame 26 proceeds from the position indicated at $a$ to a position indicated at $b$ with the portion of the axis in the first quadrant going away from the observer while the position of the axis in the third quadrant proceeds toward the observer. Of course, it will be understood that the motion to or from the observer will be dependent upon the rotation of the shaft 32. Thereafter, the axis of rotation of the inner frame 26 proceeds to uninterrupted position shown symbolically by $c$ and $d$ to the position shown at $e$ where the axis is perpendicular to the plane of the paper and mutually perpendicular to the axis of rotation of the frames 14 and 20. Thereafter, the axis of rotation of the inner frame 20 proceeds from the position $e$ until it returns to the position shown at $a$ which is parallel to the axis of rotation of the outer frame 14.

Thus, there are always two mutually perpendicular axes of rotation, the axis of rotation of the outer frame 14 and the intermediate frame 20. The third axis, namely, the axis of the inner frame 26, cycles from a position parallel to the axis of rotation of the outer frame 14 to a position of mutual perpendicularity with both of the axes of rotation of the frames 14 and 20.

In the preferred embodiment of the invention, the speeds of rotation of the outer frame 14, the intermediate frame 20 and the inner frame 26 are in a ratio of 18:19:20, with the inner frame 26 rotating at the fastest speed and the outer frame 14 rotating at the slowest speed. At this speed ratio, every point on a component mounted in the retaining means within the inner frame 26 of the apparatus is cycled through the optimum locus in the demagnetization field.

After the objects or material to be demagnetized are positioned wtihin the inner frame 26, the entire tumbling apparatus is moved to a position within a coil 54 and through the application of suitable power to a pair of connecting leads 56 and 58, the alternating current field of the desired characteristics is produced by the coil 54.

With reference to the FIGURE 2, a suitable source of current is supplied to a pair of terminals 60 and 62 which communicates with a motor control circuit 64 and a variable transformer 66. The variable transformer 66 has a movable arm 68 which would be driven in a manner to be hereinafter described. The motor control circuit 64 controls a motor 70 having a stator and rotor, as shown, and the output of the motor 70 is coupled to drive a gear box 72. The gear box 72 drives the tumbling apparatus shaft 32 as well as the movable arm 68 of the variable output transformer 66. The movable arm 68 reduces the potential and the resulting field supplied by the coil 54. A capacitor 74 is connected in series with the coil 54.

In operation, the desired maximum field is established in the coil 54. The component or material to be demagnetized is placed within the inner frame 26 of the tumbler apparatus and the apparatus positioned within the coil 54. The movable arm 68 of the variable output transformer 66 is set to the desired value and the tumbling action begins. The component is tumbled until the movable arm 68 has completed its traverse from maximum voltage to zero voltage. In actual practice, the outer frame 14 of the tumbler was rotated at a speed of approximately 40 revolutions per minute, and the movable arm 68 completed its traverse within a ten minute period.

The coil 54 may take any convenient form as long as it surrounds the tumbling apparatus and may be, for example, of a single layer of approximately 280 turns of No. 8 double cotton covered square copper wire wound on a wooden frame in the shape of a cube. The coil 54 had a DC resistance of 2.14 ohms (measured hot) and an inductance of 62 millihenries. At 60 cycles per second, the inductive reactance of the coil was 23 ohms. A supply voltage of 120 volts was sufficient to produce 50 amperes coil current when the coil was resonated with a series capacitor 74 of 106 microfarads.

Thus, there has been described an apparatus for producing random motion to objects or materials wherein a first frame is mounted for rotation and a second frame is positioned for rotation within the first frame while a third frame is positioned within the second frame. The three axes of rotation follow prescribed paths. There are always two mutually perpendicular axes of rotation. The third axis cycles from a position parallel to one of these axes to a position of mutual perpendicularity with both of these axes. The speeds of rotation of the three frames are maintained in the ratio of 18:19:20, with the inner frame rotating at the fastest speed and the outer frame turning at the slowest speed. At this speed ratio, every point on a component mounted in the inner compartment of the apparatus is cycled through an optimum locus.

In addition to the foregoing apparatus, a method has been set forth for facilitating demagnetization of components in a periodically varying magnetic field produced by an AC source. The components to be demagnetized are secured to the inner frame of the tumbling apparatus, inserted within the coil and the AC field is caused to be slowly reduced to zero during the tumbling procedure. In addition to demagnetization, the apparatus is useful for the mixing of chemicals, drugs and foods and for tumbling, polishing or pulverizing various materials where a highly random motion is desired.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for altering the position of objects to facilitate their demagnetization comprising inductive means for supplying an inductive field and a means positionable within said inductive means for providing random motion to objects supported therein, said means positionable comprising support means, a first frame positioned upon said support means and having an axis of rotation, a second frame positioned within said first frame and having an axis of rotation, a third frame positioned within said second frame and having an axis of rotation, and means cooperating with all of said frames and said support means for maintaining the axis of rotation of said first frame and the axis of rotation of said second frame perpendicular and for cycling the axis of rotation of said third frame from a position parallel to the axis of rotation of said first frame to a position perpendicular to the axes of rotation of said first and said second frames so that every point on an object mounted within said third frame is cycled through an optimum locus in the inductive field.

2. The combination as defined in claim 1 wherein the speed of rotation of said first frame, said second frame and said third frame are in the ratio of 18:19:20, respectively.

3. Apparatus for altering the position of objects to facilitate demagnetization comprising inductive means supplying a demagnetization field, and means insertable within said inductive means for providing random motion to the objects, said means comprising support means, a first frame positioned upon said support means and having an axis of rotation, a second frame positioned within said first frame and having an axis of rotation, a third frame positioned within said second frame and having an axis of rotation, means for rotating said first frame, means positioned upon said first frame and cooperating with said support means for maintaining the axes of rotation of said first and said second frames in a perpendicular relationship, and means supported by said first and said second frames and cooperating with said third frame for cycling the axis of rotation of said third frame from a position parallel to the axis of rotation of said first frame to a position perpendicular to the axes of rotation of said first and said second frames so that every point on an object mounted within said third frame is cycled through an optimum locus in the demagnetization field supplied by said inductive means.

4. Apparatus for altering the position of objects to facilitate demagnetization comprising inductive means supplying a demagnetization field, and means insertable within said inductive means for providing random motion to the objects, said means insertable comprising support means, a first frame positioned upon said support means and having an axis of rotation, a second frame positioned within said first frame and having an axis of rotation, a third frame positioned within said second frame and having an axis of rotation, means for rotating said first frame, pulley means joined by a belt and positioned upon said first frame and said support means for maintaining the axes of rotation of said first and said second frames in a perpendicular relationship, and pulley means joined by a belt and positioned upon said first frame and said second frame and cooperating with said third frame for cycling the axis of rotation of said third frame from a position parallel to the axis of rotation of said first frame to a position perpendicular to the axes of rotation of said first and said second frames so that every point on an object mounted in said third frame is cycled through an optimum locus in the demagnetization field supplied by said inductive means.

5. Apparatus for altering the position of objects to facilitate their demagnetization comprising inductive means for supplying an inductive field and a means positionable within said inductive means for providing random motion to objects supported therein, said means positionable comprising support means, a first frame positioned upon said support means and having an axis of rotation, a second frame positioned within said first frame and having an axis of rotation, a third frame positioned within said second frame and having an axis of rotation, means cooperating with all of said frames and said support means for maintaining the axis of rotation of said first frame and the axis of rotation of said second frame perpendicular and for cycling the axis of rotation of said third frame between a position parallel to the axis of rotation of said first frame to a position perpendicular to the axes of rotation of said first and said second frames so that every point on an object mounted within said third frame is cycled through an optimum locus in the inductive field, and means for reducing the intensity of the inductive field from a maximum value to zero while providing random motion to the objects.

6. The combination as defined in claim 5 wherein said means for reducing the intensity of the inductive field is an electrically driven variable tap transformer.

7. Apparatus for altering the position of objects to facilitate demagnetization comprising inductive means supplying a demagnetization field, means insertable within said inductive means for providing random motion to the objects, said means insertable comprising support means, a first frame positioned upon said support means and having an axis of rotation, a second frame positioned within said first frame and having an axis of rotation, a third frame positioned within said second frame and having an axis of rotation, means for rotating said first frame, means positioned upon said first frame and cooperating with said support means for maintaining the axes of rotation of said first and said second frames in a perpendicular relationship, means supported by said first and said second frames and cooperating with said third frame for cycling the axis of rotation of said third frame between a position parallel to the axis of rotation of said first frame to a position perpendicular to the axes of rotation of said first and said second frames so that every point on an object mounted within said third frame is cycled through an optimum locus in the demagnetization field supplied by said inductive means, and means for reducing the intensity of the inductive field inducing demagnetization from a maximum value to zero while providing random motion to the objects.

8. A method for facilitating the demagnetization of objects comprising the steps of supporting a first frame for rotation upon a pair of members, supporting a second frame for rotation within said first frame, supporting a third frame for rotation within said second frame, positioning the objects to be demagnetized within said third frame, positioning said frames within a demagnetization field, rotating said first frame so as to rotate said second frame about an axis that is perpendicular to the axes of said first and second second frames so that every point on each object to be demagnetized is cycled through an optimum locus in the demagnetization field.

9. The method as defined in claim 8 wherein the rotation of said first frame, said second frame and said third frame is in a speed ratio of 18:19:20, respectively.

10. A method for facilitating the demagnetization of objects comprising the steps of supporting a first frame for rotation upon a pair of members, supporting a second frame for rotation within said first frame, supporting a third frame for rotation within said second frame, positioning the objects to be demagnetized within said third frame, positioning said frames within a demagnetization field, rotating said first frame so as to rotate said second frame about an axis that is perpendicular to the axis of said first frame, rotating said third frame about an axis that oscillates between a position parallel to the axis of said first frame to a position perpendicular to the axes of said first and said second frames so that every point on each object to be demagnetized is cycled through an optimum locus in the demagnetization field, and reducing the intensity of the demagnetization field from a maximum value to zero while providing the random motion to the objects.

References Cited

UNITED STATES PATENTS

| | | | |
|---|---|---|---|
| 1,911,312 | 5/1933 | Good | 51—164 |
| 1,913,979 | 6/1933 | Farrington | 51—164 X |
| 1,933,455 | 10/1933 | Sommers | 51—164 X |
| 2,824,029 | 2/1958 | Zinty | 51—164 X |
| 3,046,157 | 7/1962 | Nyman | 259—79 X |

JOHN F. COUCH, Primary Examiner.

J. D. TRAMMELL, Assistant Examiner.

U.S. Cl. X.R.

51—164; 259—72, 129